United States Patent [19]

Heitmann et al.

[11] 4,226,535
[45] Oct. 7, 1980

[54] OBJECT MEASURING METHOD AND APPARATUS

[75] Inventors: Knut Heitmann; Eckart Schneider, both of Wetzlar; Heribert Lüssem, Braunfels, all of Fed. Rep. of Germany

[73] Assignee: Ernst Leitz Wetzlar GmbH, Wetzlar, Fed. Rep. of Germany

[21] Appl. No.: 931,959

[22] Filed: Aug. 8, 1978

[30] Foreign Application Priority Data

Aug. 13, 1977 [DE] Fed. Rep. of Germany ....... 2736583

[51] Int. Cl.² .................. G01B 11/14; H01J 39/12
[52] U.S. Cl. .............................. 356/373; 250/237 G
[58] Field of Search .................. 356/28, 4, 5, 373; 250/237 G

[56] References Cited

U.S. PATENT DOCUMENTS 3,902,036 8/1975 Zaleckas ...................... 219/121 LM
3,989,378 11/1976 Heitmann et al. ............. 356/398 X Primary Examiner—Vincent P. McGraw
Assistant Examiner—Rodney Bovernick
Attorney, Agent, or Firm—Schwartz, Jeffery, Schwaab, Mack, Blumenthal & Koch

[57] ABSTRACT

Apparatus is disclosed for measuring the movement of an object comprising an optical imaging device for producing an image of said object, a grating structure positioned to receive the image of said object produced by said imaging device, drive means for producing a periodic relative movement between said grating structure and the image formed thereon, means for generating reference signals corresponding to said periodic relative movement, photoelectric receiving means positioned for receiving light from said grating structure corresponding to the image thereon, said photoelectric receiving means producing electrical rotating field signals, a control circuit connected for receiving said reference signals and said electrical rotating field signals for producing control signals indicative of the movement of said object with respect to a direction of movement at least approximately parallel to said relative movement, and a bidirectional counter connected to receive said control signals for indicating the movement of said object. A method for measuring object movement is also disclosed.

21 Claims, 3 Drawing Figures

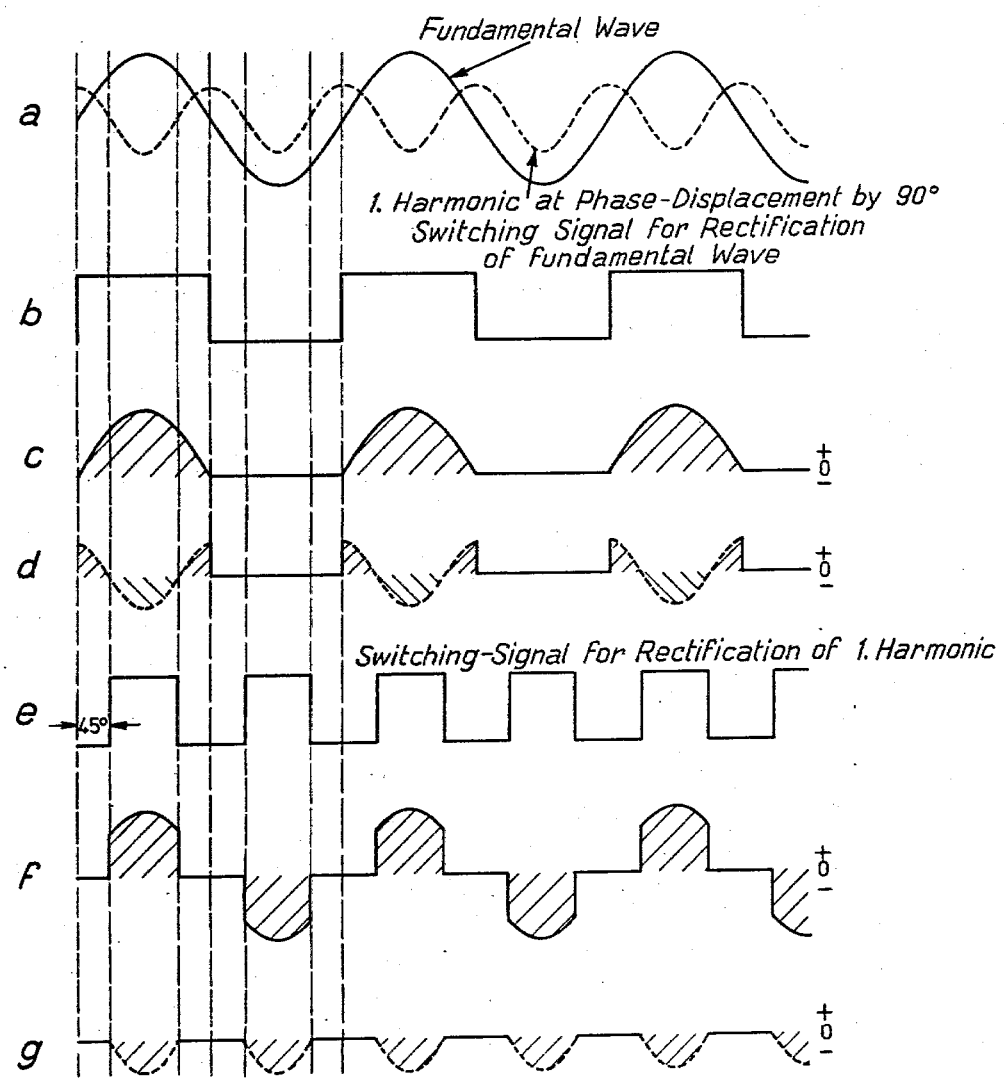

OBJECT MEASURING METHOD AND APPARATUS

BACKGROUND OF THE INVENTION

1. Field of the Invention

The invention is in the field of control systems for bidirectional counters and is particularly directed to a method and apparatus for using such a control system in connection with an optical correlator.

2. Description of the Prior Art

The invention concerns a method to obtain out-of-phase control signals forming an electrical rotating field for a bidirectional counter with the use of a measuring device having at least one optical device imaging an object, at least one grating structure, a drive to produce a periodic relative movement between the image of the object generated by the imaging optical device and the grating structure and a photoelectric receiver system coordinated with the grating structure to detect the movement of the object reproduced, in one of two opposing directions at least approximately parallel to said relative movement.

Optical correlators for the measurement of the relative movement of an object without special markings are known for example from German Offenlegungsschrift DT-OS 2 144 487, (equivalent to U.S. Pat. No. 3,989,378) incorporated herein by reference. Typically, the grating structure of the correlator is moved transversely to the optical axis of the imaging system, a reference signal is derived from this movement and the direction of motion of the object is dertermined by utilizing the reference signal being phase sensitively rectified. The signals obtained indicate the direction of the relative movement of the object of their frequency. They are suitable merely for the control of an indicator. Alternately, these signals may control two separate counters, each assigned to one direction of motion. In such a case, however, the instantaneous relative position of the object must be determined by forming the difference of the present count of the counters. This method is cumbersome and expensive.

It is therefore the object of the invention to provide a new method and apparatus which makes it possible to control a bidirectional counter interconnected specifically with an optical correlator. In the method, the complexity of the instrumental outlay provided between the correlator and the counter is maintained low to achieve an optimum, low cost system.

SUMMARY OF THE INVENTION

The solution of the problem involves a method of the type identified hereabove, characterized in that an even-numbered and an odd-numbered harmonic wave of the output signals of the photoelectric receiver system are rectified in a phase sensitive manner. The phase sensitive rectifiers are controlled by means of reference signals derived from the periodic movement of the grating structure. These reference signals correspond in their frequency to one of the harmonics, and at least one of the reference signals is displaced in phase relative to the other. The signals resulting from the phase sensitive rectification are fed, after filtering, to a bidirectional counter in the form of control signals displaced in phase with respect to each other.

The solution of the problem may, however, also result in a method which is characterized in that the fundamental wave and one odd-numbered harmonic of the output signals of the photoelectric receiver system are rectified in a phase sensitive manner and fed to phase sensitive rectifiers which are controlled by means of reference signals derived from the periodic movement of the grating structure. The reference signals correspond in their frequency to the fundamental wave or the harmonic selected. The reference signal corresponding to the harmonic is displaced in relation to its phase position, and the signals resulting from the phase sensitive rectification, after filtering, are fed to a bidirectional counter in the form of control signals displaced in phase in relation to each other.

It is of advantage in the method to select the first harmonic as the odd-numbered harmonic wave. An apparatus for performing the novel method comprises at least an optical device for producing an image of the object, at least on grating structure, a drive to produce a periodic relative movement between the image of the object generated by the imaging optical device and the grating structure and a photoelectric receiver system coordinated with the grating structure to detect movements of the object in one of two opposing directions. These two opposing directions are at least approximately parallel to the relative motion between the grating structure and image. A signal shaper stage is provided which receives a reference signal derived from the relative motion between the image of the object and the grating structure. The shaper stage is followed by a first frequency multiplier, which, in turn is followed by a first phase sensitive rectifier which feeds a subsequent low pass filter. A second phase sensitive rectifier with a subsequent low pass filter is provided and connected either by means of a second frequency multiplier or by direct connection with the signal shaper stage, whereby the reference signals are fed to the control inputs of the phase sensitive rectifiers. In at least one of the connections between the signal shaper stage and the phase sensitive rectifiers a phase shifter is provided. The inputs of the phase sensitive rectifiers are connected additionally with the photoelectric receiver system of the measuring device and the outputs are connected to low pass filters. These filters are in turn connected with the inputs of the bidirectional counter which is controlled thereby.

Utilizing the fundamental wave and the first harmonic it is of advantage to dimension the width of the periodic movement between the image of the object and the grating structure to be equal to one-half of the divisional period of the grating structure. The moving parts of the drive form, together with the parts activated thereby, a natural resonance vibrating unit.

As has been shown, the new method provides a solution of the problems of the prior art in terms of simplifying the equipment outlay. It has also been found, however, that the method functions safely even with very slow relative movements of an object having no special markings thereon.

BRIEF DESCRIPTION OF THE DRAWINGS

The invention shall be described hereafter with the aid of schematic drawings of preferred embodiments wherein:

FIG. 2 shows signal waveforms derived from the circuit diagram of FIG. 1; and

FIG. 1 shows the circuit diagram of a device suitable for the performance of the method in accordance with the invention wherein the fundamental wave and the first harmonic of the output signal of the photoelectric receiver system of an optical correlator are employed to generate the control signals for the bidirectional counter.

DETAILED DESCRIPTION OF THE PREFERRED EMBODIMENTS

Figure 1:
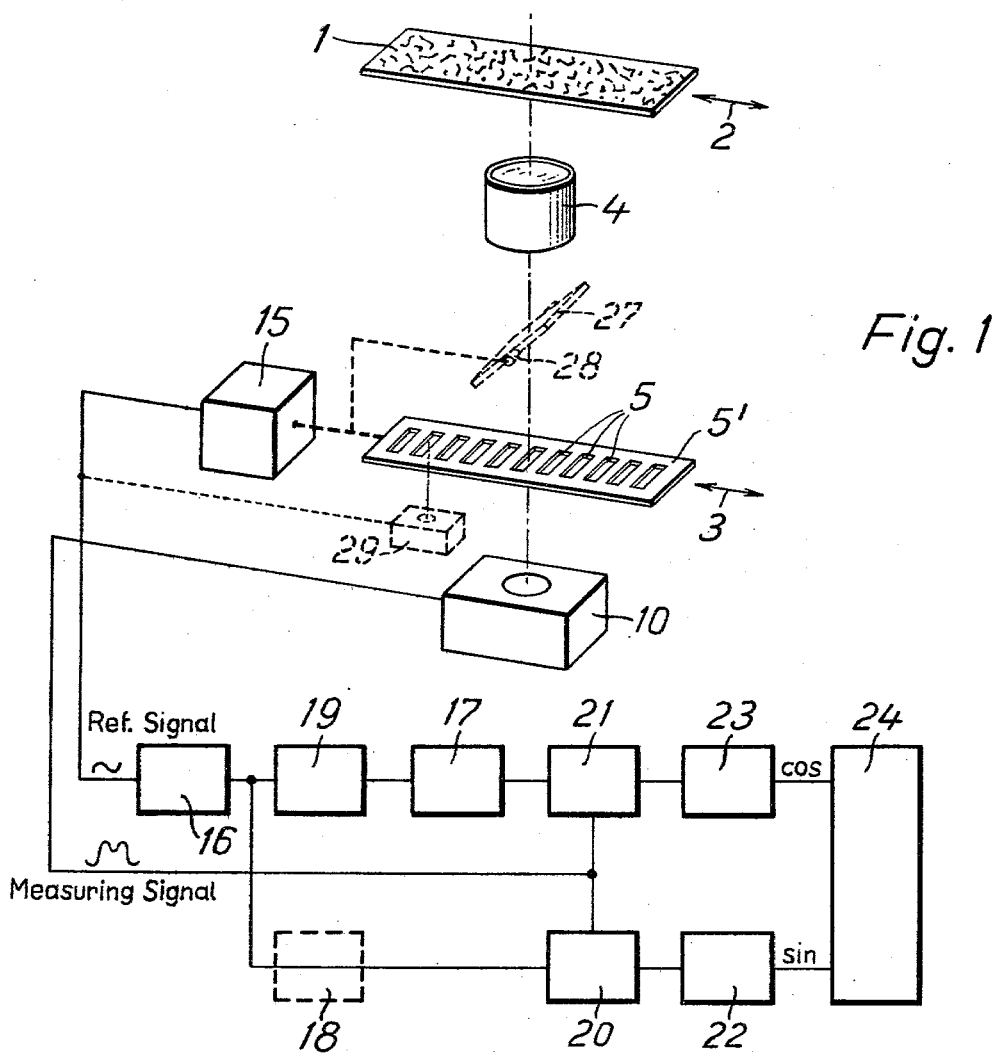
FIG. 1 is a circuit diagram of a control circuit and optical correlator in accordance with the invention.

FIG. 1 shows the basic structural elements of an optical correlator. An object 1 which possesses optical structuring but no special markings, the relative movement of which is to be measured in the direction of the double arrow 2, is reproduced or imaged by means of an optical device 4 on a grating structure 5 which is located at least in the vicinity of the image plane of the optical device 4. The divisional periods of the grating structure 5 are matched to the structures of the object, so that the grating structure acts as a spatial frequency filter. A photoelectric receiver system 10 is coordinated with the grating structure 5. A drive 15 is connected to grating structure 5 to reciprocate same in the direction of the double arrow 3 which is approximately parallel to the direction indicated on the double arrow 2. The receiver system 10 consists, in the simplest case, of a single photoelectric receiver. Alternately, the correlator functions with push-pull signal generation and in such a case, the photoelectric receiver system comprises at least two photoelectric receivers connected in a push-pull arrangement. Electrical signals from these photoelectric receiver are fed to a push-pull amplifier in order to improve their signal-noise ratio. The output signal of the receiver system 10 represents the desired measuring signal. Thus, in this case, the photoelectric receiver system 10 comprises two photoelectric receivers and the push-pull amplifier fed by the receivers. It should be noted that the conditions necessary for the adequate energization of the receivers furnishing the electrical push-pull signals should be created in the optical part of the correlator. One possibility for doing this is described in the aforementioned German Offenlegungsschrift, equivalent to U.S. Pat. No. 3,989,378.

The photoelectric receiver system of the optical correlator described above is followed by a circuit as shown in the circuit block diagram of FIG. 1. As shown therein, the output signals of the receiver systems 10 are fed to two phase sensitive convertors or rectifiers 20, 21. Reference signals derived from the drive 15 are shaped in a signal shaper stage 16 preferably into rectangular voltage pulses. These pulses are fed to the phase sensitive rectifier 20 directly and to the phase sensitive rectifier 21 via a frequency multiplier 17. The phase sensitive rectifiers 20, 21 are each followed by a low pass filter 22 and 23, respectively. These filters are tuned to the frequency of the measuring signal from the receiver system 10. The outputs of these filters are electrically connected to the inputs of the bidirectional counter 24 which is controlled thereby.

As may be seen, a phase shifter 19 is inserted in the line between the signal shaper stage 16 and the phase sensitive rectifier 21. The phase shifter 19 serves to optimize the phase relationship between the reference signal and the portion of the measuring signal corresponding thereto. Details will be found in the following explanation of the mode of functioning of the apparatus.

The operation of the apparatus is described with reference to the waveforms of FIG. 2. It will be assumed for the sake of simplicity that the vibration amplitude of the grating structure is chosen to be equal to one-half of the divisional period of the grating structure and that the object 1 is considered to be a point source. Further, one may assume that an optical correlator is utilized wherein two receivers are connected in a push-pull relationship to furnish electrical signals. Thus, the photoelectrical receiver system 10 comprises the two push-pull receivers together with an appropriate amplifier.

When the point source is centrally located with respect to the vibrational amplitude of the grating structure, the photoelectric receiver system in practice yields a voltage waveform such as shown by the dotted line in graph (a) of FIG. 2. It has a double vibrational frequency. When, on the other hand, the point source is at an end or reversal point of the vibrational motion, an electrical signal waveform such as shown by the solid line in graph (a) is produced. The frequency of this waveform is identical with the vibrational frequency of the grating structure.

As indicated hereabove, reference signals are derived from the vibrational motion itself. These reference signals are used in controlling the phase sensitive rectifiers 20, 21, following their transformation into rectangular potential waveforms. It is necessary, however, for this purpose to match one reference signal with respect to its phase position to the phase position of the portion of the measuring signal of higher frequency. In the present example, the phase shifter 19 shifts the phase by 45° as shown in graph (e). Graph (e) illustrates the output waveform from frequency multiplier 17 (X2, for example) and thus shows the phase shifted, frequency multiplied waveform of the control signal of graph (b). The phase shift is done since the extreme values of the two measuring signals shown in graph (a) coincide in time. The control signal corresponding to the signal shown in graph (a) by a solid line is illustrated in graph (b). Graph (c) shows the output signal of the phase sensitive rectifier 20, while graph (f) displays the output signal of the phase sensitive rectifier 21. Graphs (c) and (f) are applicable when the output signal of the photoelectric receiver system comprises solely the portion of the signal shown by the solid line in graph (a). In contrast, graphs (d) and (g) illustrate the corresponding waveforms applicable when the photoelectric receiver system produces only portions of signals such as those shown in graph (a) by the dotted line. As may be seen from the signals displayed in graphs (d) and (f) both waveforms have average values of zero. This, however, signifies that no output signals are obtained at the filter 23 for the portion of the measuring signal shown by the solid line in graph (a) and at the filter 22 for the other portion of said measuring signal shown in graph (a) by the dotted line. As a result, filtering of the signals in front of the phase sensitive rectifiers is unnecessary, which represents another advantage of the new method.

The discussion presented hereabove shows that the output signals exactly define the instantaneous relative position of the object point. Even though this discussion is directed to extreme positions of said point, the considerations presented are equally valid for other localizations of the object point, through which said point may pass for example during a relative movement of the object.

The output signals issuing from the filters 22, 23 are always displaced by 90° in phase with respect to each other and are thus suitable for the control of the bidirectional counter 24. They are further suitable for the feeding of an interpolator, such as the one representing the subject matter disclosed in German Pat. No. 1,498,137, incorporated herein by reference, and thus provide for further refining of the measured result.

If in contrast to the assumption adopted in the foregoing, the vibrational amplitude of the grating structure is chosen to be higher than one-half of the divisional period of said structure, then additional measuring signal portions of higher frequency are obtained. With a proper signal selection, these signals may also be used in the performance of the new method.

Obviously, modifications of what has been represented and described heretofore, are possible. For example, if the object to be measured displays strongly differentiating structure, the design of the optical correlator, instead of as described above, may comprise a system with only a single photoelectric receiver. In this case, the parts of the optical correlator connected with the splitting of light also become unnecessary. Also, the phase shifter 19 may follow the frequency multiplier 17 in the line sequence.

It is equally possible to generate the relative movement between the image of the object and the grating structure 5 by means of an oscillating agitated optical structural part. As an example, in the embodiment of FIG. 1, a plane parallel plate 27, shown in the path of the beam by a dotted line, may be provided. The plaate may be driven into a vibrational motion by the drive 15 around an axle 28. In this case, the grating structure is stationary.

A further alternative is shown in FIG. 1 wherein a photoelectric receiver 29 (represented by a dotted line) is shown as the pick-off, for the generation of the reference signal. This receiver then scans the movement of the grating structure 5 or its carrier 5'.

In the operational example given above, the fundamental wave and the first harmonic of the vibrational motion of the grating structure are employed for the generation of the reference signals, because, together with the limitation of vibrational amplitude, this selection yields especially favorable conditions. If this amplitude limitation is omitted, in principle other harmonics of the vibrational motion may also be used to form the reference and control signals. In such a case, in the line between the signal shaper stage 16 and the phase sensitive rectifier, a frequency multiplier 18 (dotted line) is again required. The reference signals may be derived from the movements of the grating structure in a number of ways. For example, the signals may be obtained by means of the photoelectric scanning of the grating structure 5 or its carrier 5' through the synchronous operation of a reference signal generator or the tapping of the current supplying the drive. The generation of the reference signal is not new and to this extend is not part of the present invention.

The invention has been described heretofore in its application in an optical correlator. It may, however, be used with the same advantage in other measuring instruments for length and angular measurements. Such instruments are well known and may generally be termed incremental transducers.

Such devices are frequently designed so that two signals are produced optically by way of separate channels. These signals are generally offset preferably by 90° in phase, thus forming an electrical rotating field signal for feeding a bidirectional counter. Examples of such transducers are given in British Pat. Nos. 760 321 and 877 925, both patents being incorporated herein by reference. The arrangements described in the first patent have the disadvantage that three gratings of the same type with exactly identical divisions are used, two of which must be fixed in a certain relative position with respect to each other. The accuracy of the results of the measurements depends directly on the accuracy to which the gratings are made and their exact positioning.

In the second patent an arrangement is described, which employs a Wollastone prism to split the beam and to differentially polarize the light flux in the partial beams. The disadvantage inherent in these instruments consists of the fact that an equal proportion of photoelectrically produced signals must also be processed, which in case of fluctuations of the latter results in errors which directly enter the measured result.

Figure 3:
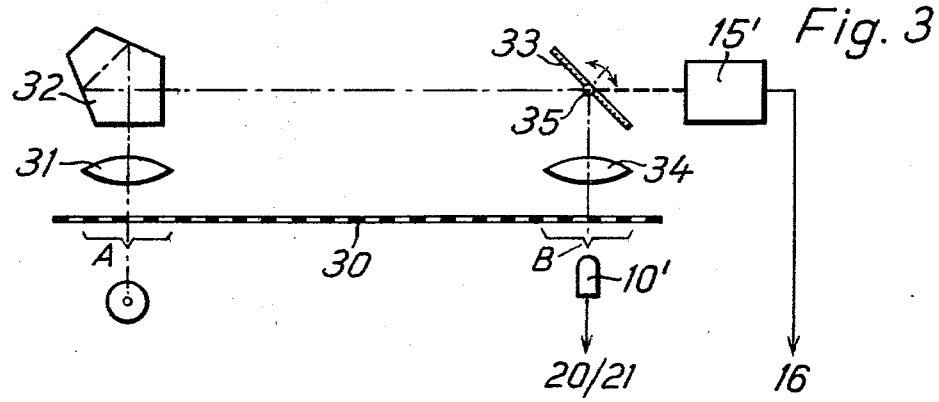
FIG. 3 illustrates an example of an embodiment of a photoelectric incremental transducer.

Such conditions are avoided in accordance with the present invention. FIG. 3 schematically shows an embodiment of an incremental transducer to execute the method of the invention.

An area A of grating structure 30 is reproduced by means of an optical device 31, a pentaprism 32, a planar mirror 33 and another optical device 34 on an area B of the same grating structure. The mirror 33 is supported rotatably around an axis 35. A drive 15' produces an oscillating motion of the mirror. A photoelectric receiver 10' is coordinated with the area B. The drive 15' and the receiver 10' are connected with the evaluating circuit, as shown in the example of FIG. 1 for the structural groups 15 and 10. The mode of operation of the evaluating circuit has been described hereabove.

A particular advantage of the embodiment of FIG. 3 consists of the fact that, because of the carrier frequency generation of the signal, only one receiving channel is required. This single channel furnishes both signals offset in phase by 90°. In addition, the operation is no longer dependent on the average permeability of the grating structure, i.e. the web/hole ratio of the latter, together with its fluctuations, because the d.c. proportion of the signal is eliminated. An electrical rotating signal with ideal positioning of the axes is obtained. Fluctuations of the permeability of the grating structure merely cause a variation in the amplitude of the signal; its center remains stationary.

What is claimed is:

1. Apparatus for measuring the movement of an object comprising:
   (a) an optical imaging device for producing an image of said object;
   (b) a grating structure positioned to receive the image of said object produced by said imaging device;
   (c) drive means for producing a periodic relative movement between said grating structure and the image formed thereon;
   (d) means for generating reference signals corresponding to said periodic relative movement;
   (e) photoelectric receiving means positioned for receiving light from said grating structure corresponding to the image thereon, said photoelectric receiving means producing electrical rotating field signals;
   (f) a control circuit connected for receiving said reference signals and said electrical rotating field signals for producing control signals indicative of the movement of said object with respect to a direction of movement at least approximately parallel to said relative movement; and (g) a bi-directional counter connected to receive said control signals for indicating the movement of said object.

2. Apparatus as recited in claim 1, wherein said control circuit comprises:
(a) two phase sensitive rectifiers, each having a signal input, a control input and an output;
(b) means for connecting said electrical rotating field signals to the signal input of said phase sensitive rectifiers;
(c) means connected for receiving said reference signals for generating phase-shifted, frequency multiplied reference signals in response thereto; and
(d) means for connecting said reference signals to the control input of one of said phase-sensitive rectifiers and for connecting the phase-shifted frequency multiplied reference signals to the control input of the other of said phase-sensitive rectifiers, said phase-sensitive rectifiers producing said control signals.

3. Apparatus as recited in claim 2, wherein said bi-directional counter has first and second inputs and said control circuit further comprises a low pass filter connected between one of said phase-sensitive rectifiers and the first input of said bi-directional counter, and a second low pass filter connected between the other of said phase-sensitive rectifiers and the second input of said bi-directional counter.

4. Apparatus as recited in claim 2, wherein said electrical rotating field signals have at least an odd and even number harmonic component and wherein one of said reference signals or phase-shifted, frequency multiplied reference signals has the same frequency as one of said components.

5. Apparatus as recited in claim 3 or 4 wherein said control circuit further comprises means for shaping said reference signals for forming substantially squarewave reference signals, said shaping means positioned to receive said reference signals and providing said shaped reference signals to said phase-shifting frequency multiplying signal generating means.

6. Apparatus as recited in claim 1 wherein said drive means comprises means for moving said grating structure transversely of an optical axis of said optical imaging device.

7. Apparatus as recited in claim 1 wherein said means for generating said reference signals comprises said drive means.

8. Apparatus as recited in claim 1 further comprising an optical means disposed between said imaging device and said grating structure for directing said image along said grating structure, and wherein said drive means is connected for periodically moving said optical means.

9. Apparatus as recited in claim 1, 4, 6 or 8 wherein said optical imaging device, said photoelectric receiving means and said grating structure form components of a photoelectric incremental transducer.

10. Apparatus as recited in claim 1 wherein said reference signal generating means comprises a photoelectric receiver positioned to receive light from said grating structure.

11. Apparatus as recited in claim 1, 3 or 4 wherein the drive means produces a relative movement having a magnitude approximately equal to one-half of the divisional period of the grating structure.

12. Apparatus as recited in claim 6 wherein said drive means and grating structure vibrate at a neutral resonance frequency.

13. Apparatus as recited in claim 4 wherein said odd component of said electrical rotating field signal is the first harmonic and the even component is the fundamental frequency.

14. A method for measuring the movement of an object comprising the steps of:
(a) producing an image of the object using an imaging device;
(b) positioning a grating structure to receive the image;
(c) providing a periodic relative movement between the grating structure and the image;
(d) generating reference signals corresponding to the periodic relative movement;
(e) positioning photoelectric receiving means to receive light from said grating structure;
(f) generating electrical rotating field signals from photoelectric receiving means corresponding to the periodic relative movement of said image and grating structure;
(g) generating control signals from said electrical rotating field signals and said reference signals; and
(h) feeding said control signals to inputs of a bi-directional counter;
whereby said counter provides a measure of the movement of said object.

15. A method as recited in claim 14 wherein the step of generating said control signals comprises the steps of:
(a) feeding said electrical rotating field signals to at least two phase-sensitive rectifiers;
(b) generating a phase-shifted, frequency multiplied reference signal;
(c) feeding said reference signal to one of said phase-sensitive rectifivers; and
(d) feeding said phase-shifted, frequency multiplied signal to the other of said phase-sensitive rectifiers;
whereby said phase-sensitive rectifiers produce said control signals.

16. A method as recited in claim 15 further comprising the step of feeding said control signals to low pass filters and subsequently to said bi-directional counter.

17. A method as recited in claim 15 wherein said electrical rotating field signals have at least an odd and even number of harmonic components and wherein one of said reference signals or phase-shifted, frequency multiplied reference signals has the same frequency as one of said components.

18. A method as recited in claim 17 wherein said odd component of said electrical rotating field signal is the first harmonic and the even component is the fundamental frequency.

19. A method for obtaining control signals for use with a bi-directional counter and an optical correlator having an image forming means, a grating for receiving the image, means for producing periodic relative movement between the image and grating, and photoelectric receiving means for generating electrical rotating field signals corresponding to the object movement in a direction at least substantially parallel to the relative movement comprising the steps of:
(a) rectifying the fundamental and at least an odd harmonic component of the electrical rotating field signals generated by the photoelectric receiving means using phase-sensitive rectifiers;

(b) generating reference signals from the relative periodic movement of the grating and image corresponding in frequency to the fundamental and odd harmonic component of the electrical rotating field signals;

(c) phase displacing said generated harmonic reference signals;

(d) controlling said rectifying step in response to said fundamental reference signals and said phase-displaced harmonic reference signals;

(e) filtering the outputs of said phase-sensitive rectifiers; and (f) feeding said filtered outputs to inputs of said bi-directional counter.

20. A method as recited in claim 19 wherein said odd harmonic is a first harmonic.

21. A method as recited in claim 19 or 20 wherein the degree of periodic relative movement between the image and grating is approximately equal to one-half of the divisional period of the grating.

* * * * *